Figure 2:
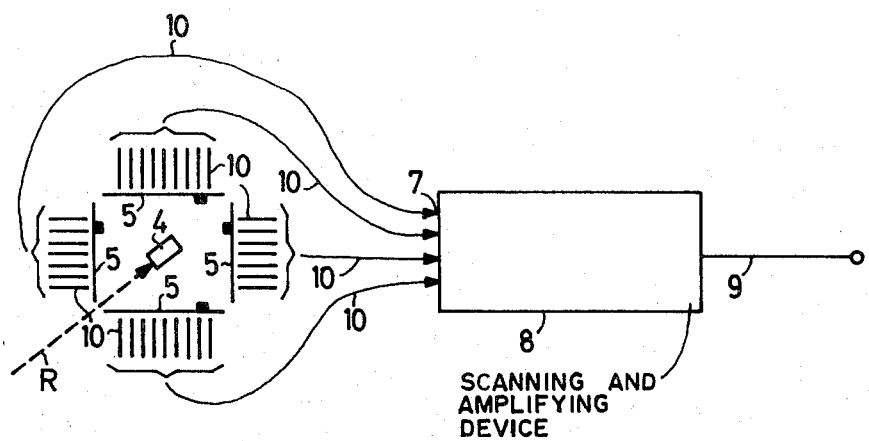

United States Patent [19]
Abrahamsson

[11] 3,784,816
[45] Jan. 8, 1974

[54] METHOD FOR EXECUTING TIME-DETERMINED ANALYSIS IN PHYSICAL OR CHEMICAL EXAMINATION OF SUBSTANCES AND AN APPARATUS FOR EXECUTING THE METHOD

[76] Inventor: Sixten Abrahamsson, 31, Sodermalmsgatan, Molndal, Sweden

[22] Filed: June 1, 1970

[21] Appl. No.: 42,258

[30] Foreign Application Priority Data
May 30, 1969 Sweden.............................. 7700/69
Feb. 13, 1970 Sweden.............................. 1892/70

[52] U.S. Cl. ......250/273, 250/41.9 D, 250/71.5 R
[51] Int. Cl. .............................................. G01n 21/00
[58] Field of Search .................. 250/51.5, 71.5 R, 250/41.9 D

[56] References Cited
UNITED STATES PATENTS

| | | |
|---|---|---|
| 3,198,944 | 8/1965 | Furbee.............................. 250/51.5 |
| 3,242,333 | 3/1966 | Yamamoto ..................... 250/41.9 D |
| 3,316,392 | 4/1967 | Bailey et al. ..................... 250/51.5 X |
| 3,462,601 | 8/1969 | Sternglass ....................... 250/71.5 R |
| 3,452,193 | 6/1969 | Petersen ........................ 250/51.5 X |
| 3,456,108 | 7/1969 | Pichoir............................ 250/51.5 X |
| 3,569,708 | 3/1971 | Weinbaum......................... 250/71.5 |
| 3,596,092 | 7/1971 | Marjoram ......................... 250/51.5 |

*Primary Examiner*—Archie R. Borchelt
*Attorney*—Waters, Roditi, Schwartz & Nissen and Roberts & Cohen

[57] ABSTRACT

The invention concerns a method for measuring the magnitudes of a great number of quantities which may vary very rapidly within wide limits. Each of the magnitudes to be measured is converted into a light signal having an intensity corresponding to the magnitude of the respective quantity. All such light signals are individually integrated during successive, accurately defined time intervals. At the end of each interval it is determined which integrals having reached at least one of a plurality of predetermined levels.

12 Claims, 2 Drawing Figures

Fig.1

METHOD FOR EXECUTING TIME-DETERMINED ANALYSIS IN PHYSICAL OR CHEMICAL EXAMINATION OF SUBSTANCES AND AN APPARATUS FOR EXECUTING THE METHOD

The present invention relates to a method and apparatus for examining physical or chemical properties of substances.

In particular, an object of the invention is to improve the examining of properties of a subject of the examination and to provide an improved apparatus for measuring magnitudes of detected measuring values varying with time, and, in particular, to obtain a recording of the measuring of results when measuring extremely repid events, an indication of magnitudes of measured values being obtained by means of a plurality of detecting means sensing the magnitude to be measured and storing an electric charge representative of the magnitude until measured.

A major object of the invention is to improve X-ray crystallographic analysis, in combination with which the invention will be more closely described below, for massspectrometry, and for other similar examination where it is of interest to obtain a recording of extremely short-timed events.

To-day, X-ray crystallographic examination is one of the most valuable aids when studying the athomic architecture of chemical compounds, and has important application within the fields of solid-state physics and the molecular biology. The technique in question is extremely attractive due to the fact that it does only provides unegivocal and exact information about the structure of compounds under examination, but can as well reveal details about the electron distribution of atoms in chemical linkings.

In crystallographic examination, a very large number of X-ray reflexes are to be registered (about 3,000 for a medium size molecule), as well as their direction and their intensity. With the availability of very rapidly working data machines it has been possible to perform crystallographic calculations based on as wide as material as desired, the technique used therewith further having been facilitated by the availability of automatic apparatuses for recording and evaluating X-ray reflexes.

At present, the most common analysis method is to record reflexes on a film, the film then being evaluated manually or automatically. The photographic film recording of a data material often requires considerable time, two full weeks, for instance, while the evaluation of such films could be performed within and hour or so.

In a second known method, recording is effected by means of a scintillation counter, the X-ray radiation being by fluorescence converted into light quants in a scintillation crystal, the quants causing ejection of photo electrons, which are then accelerated and multiplied in a photo multiplication tube with a number of dynodes. An amplification of more than $10^6$ is obtained an generated pulses are counted in an electronic pulse counter. By this method a high intensity accuracy is obtained (1 percent with even minute reflexes). Due to the fact that only one or a few reflexes are examined at a time, the number of detector and crystal movements required will be enlarged, as well as the number of recordings. For a particular substance, a couple of weeks are required for collecting data.

An object of the present invention is to provide crystallographic x-ray analysis and mass spectography in particular, combining the advantage of the simultaneous recording obtained by means of photographic film recording with the high sensitivity of a scintillation counter.

The invention is based on the following points of view:

A first demand that is to be put on the detectors of the physical property to be measured is that a parallel network of detecting elements with related hardware for transferring detector signals to data information that can be used for necessary following calculation is not unrealistically expensive. The exit angle of diffracted X-rays should be measured with a resolution of about 1°. To detect all reflexes, the resolving power should be such that a reflex is measured by a number of detector elements and the magnitudes of the reflex, that is, intensity and exit angle, be calculated from the measurement information of a number of measuring points of the reflex. To this end, a detector element should cover an angular area of about 0.3° ×0.3°, wherefore about 500,000 detector elements are to be arranged spherically about the crystal under investigation. To obtain a desired result, such a network of detector elements should be able to provide measurements of all intensities between about 60 quanta per second and 100,000 quanta per second with a preselected accuracy of between 2 percent and 10 percent. The measuring data is amplified and adapted so as to be fed to and stored in a conventional computor for further processing A demand to be put on the detecting means to provide simultaneous measurement of reflexes of all present intensities is that the detecting means comprise integrating elements such that an integration of energy representative of the magnitude to be measured, viz. integration of X-ray energy, for instance, is obtained during an integration period, which is so long that energy corresponding to the weakest reflexes are based on at least 100 x-ray quantums, the linear integration range being so large that strong reflexes having an energy based on about 200,000 X-ray quantums can be measured. In case the integration element is of the digital type, a demand to be put therein is thus that it could count at least up to 200,000, which would lead to very elaborate data equipment due to the fact that the number of integration elements required is the same as the number of detector elements.

Integration elements of analogous type are not usable in practice, the accuracy having to be at least 0.05 pro mille.

The invention has as an object the elimination of the difficulty, not to say impossibility at present, of providing apparatuses for effecting such recording.

Instead of using integrators having a large linear range, as in the situation just described, in which measuring equipment known per se is arranged so as to provide a desired rapidity during measurement while maintaining required accuracy, the invention provided a method by means of which integrators having a rather small linear range can be used, the measurement being executed in such a manner that, in an apparatus comprising a plurality of detecting means for generating light in correspondence to the magnitude to be measured originating from an examined object at the measuring location, and comprising means for integrating the magnitude received by the detecting means, the magnitude being brought to actuate said detecting means during a plurality of accurately determined time periods, and determining, at the end of each such defined actuation intervals, which ones of the integration means in the plurality of such means which have attained a specific one of one or more predetermined levels of the integration magnitude representative of the intensity of the magnitude actuating the respective detective means and generated in said detecting means by the integrated magnitude.

The invention will be described below with reference to the accompanying drawing as adapted for an X-ray examination by detecting X-rays emitted in different directions from a crystal exposed to X-ray radiation.

In the drawing

Figure 1:
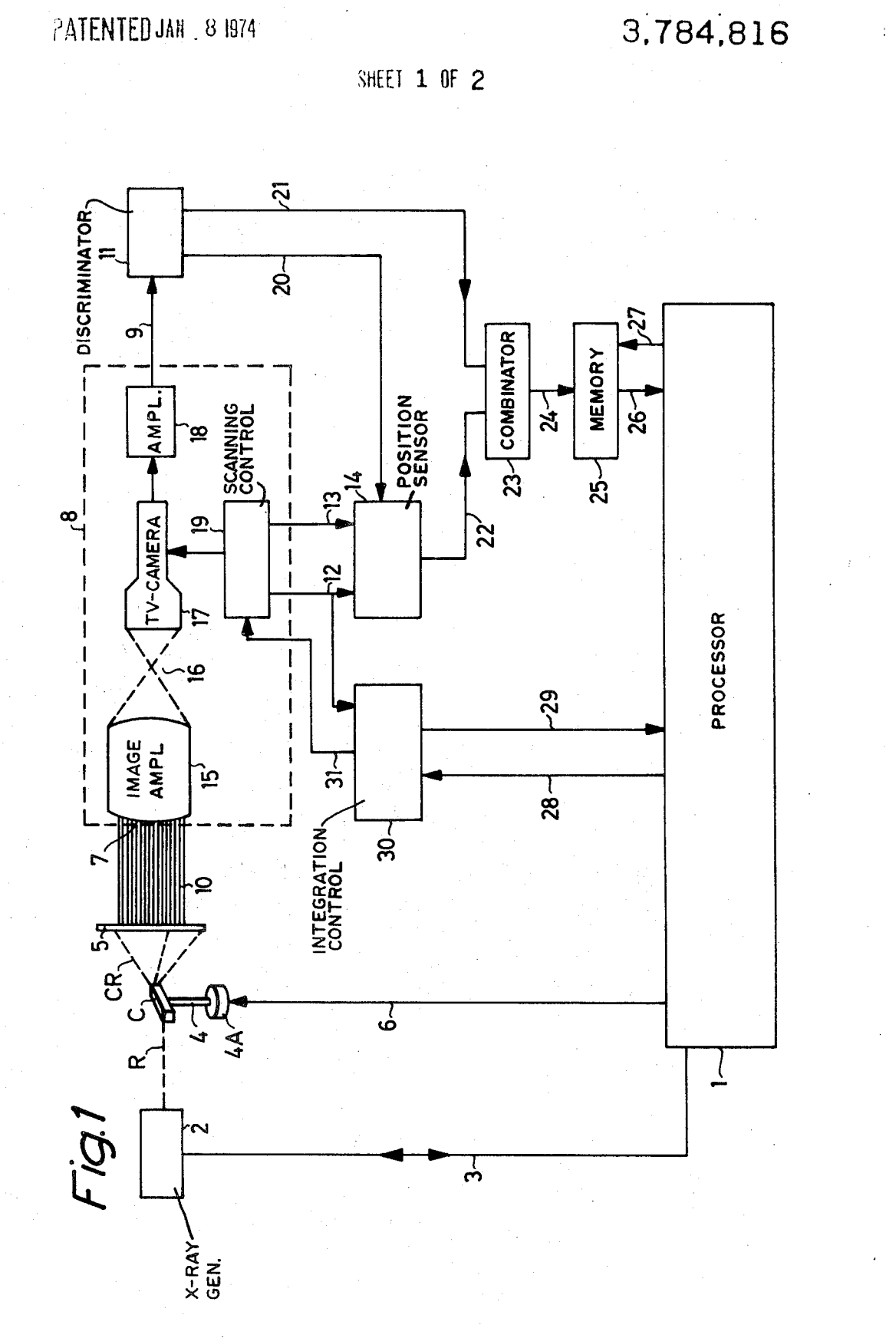

FIG. 1 illustrates an embodiment of such an apparatus with components thereof shown as blocks; and FIG. 2 shows a detail of the apparatus according to FIG. 1 for detecting radiation emitted in different directions from a crystal when exposed to a primary X-ray.

The block diagram of FIG. 1 schematically shows an apparatus according to the invention in combination with or comprising a data processing computer 1, to which signals representative of measuring results are fed for following evaluation, the computer conceivably and conveniently being programmed for the generation of control signals for or the receiving of control signals from an X-ray source 2, used for the X-ray diffraction measurement, via a control signal line 3. As the case may be, such control signals could as well be present to actuate possibly desired filters for a primary X-ray ray R used for an examination of an object C.

In the embodiment illustrated in FIG. 1, the apparatus comprises a rotatable object table 4 for rotating the object C of measurement into different successive positions relative to X-ray source 2 and an X-ray-light transducer, a fluorescence screen 5, arranged to receive radiation CR diffracted from the object.

The rotatable object table 4 comprises means, such as a step motor 4A, for instance, for stepwise rotating of the object between successive measurements of X-ray radiation diffracted from the object. The rotations of the object table is effected by control signals from the computer received via a control signal line 6.

The image of the radiation emitted from crystal C and hitting the X-ray-light transducer 5 is transferred to the entrance window 7 of an image scanning and image signal amplifying means 8 of high sensitivity. Although a transfer of the image generated on fluorescence screen 5 to the entrance window 7 of the image scanning and amplifying means 8 could, as a general principle, be provided for by an optic lens system, specific advantages are obtained by using fibre optics for the purpose, such fibre optics, which are per se well known to the art, being schematically represented by parallel lines 10. A fibre optic system provides improved efficiency of light and each fibre of the system represents a discrete area of the fluorescence screen 5 and a photo mosaic or corresponding means representing the entrance window 7 of the image scanning and amplifying means 8.

In the image scanning and image signal amplifying means 8 the image transferred from fluorescence screen 5 to entrance window 7 is integrated by the photo mosaic during an integration period before being scanned to convert the image into an electric video signal, modulated in correspondence to amplitude and location of entering light.

In a preferred embodiment, the components which make up block 8 comprise an image amplifier 15, per se well known in the art, providing for a so called parallel simultaneous amplification of all image elements of the image, an optical transfer means 16, conveniently a fibre optic or a lens optical system, transferring the amplified image to a TV camera 17, of the SEC vidicon or ISOCON type, for instance, in which the image is further amplified and integrated and scanned by means of a scanning electronic circuit 19 and converted into an electric video signal in a manner well known per se.

The video signal thus obtained is further amplified in a conventional video signal amplifier 18 with low noise level. The output signal thus obtained from the image scanning means are thus signals as such well known from TV systems, namely a. a video signal on video signal line 9,
b. a picture shift pulse signal on picture pulse line 12,
c. a line shift pulse signal on line pulse line 13.

Video signal line 9 applies the video signal to an intensity measuring device or discriminator 11 to measure the signal amplitude by means of a network of signal level discriminators. The picture pulse signal and the line pulse signal are applied via line 12 and line 13, respectively, to a position measuring device 14, measuring the coordinates of the electron beam in dependence on the pulses by means of electronic counters.

Video signal intensity measuring device 11 has an output lead 20 connected to an input of the position measuring device 14 to transfer thereto a measurement coordination signal when the amplitude of the video signal exceeds a predetermined level, position data and intensity data being at this instance generated in an output signal line 22 from position measuring device 14 and an intensity data output line 21 from device 11 to a data combinator 23, in which position data and intensity data are combined to a form adapted to the computer.

When the scanning of the image scanning means is provided in accordance with standards of TV systems, the scanning proceeds so rapidly that the computer might possibly not be able, immediately to receive data words generated by the data combinator 23, wherefore such data words are transferred from the output of combinator 23 to a data memory device 25 comprising a minor size rapid-memory.

Computer 1 is programmed by means of data transfer control signals via data transfer control signal line 24 to control the data flow from memory 29 to the computer via a data transfer line 26.

Further, computer 1 is programmed to control the sequence of integration times in such a manner that integration time length is transferred in digital coded form via an exposure data line 28 to an exposure electronic circuit 30. On appearance of a picture pulse signal from scanning means 19 on picture pulse line 12, a blocking signal is generated by exposure circuit 30 via a blocking signal output lead 31 to scanning means 19, where said signal provided a blocking of the scanning electron beam of the TV camera. The duration of said blocking signal is dependent on the digitally coded integration period length and on disappearance of the blocking signal, a scanning start pulse is generated on the output lead 31 of exposure circuit 30 to the computer via a scanning start pulse output line 29 of exposure circuit 30.

In a preferred embodiment according to the invention the X-ray-light transducer 5, the fibre optic system 10, and the picture scanning and amplifying means 8 are combined in one unit as illustrated in FIG. 2. FIG. 2 thus illustrates by way of example a picture generation and scanning device comprising an X-ray-light transducer arrangement having one or more X-ray-light transducers 5 together, as the case may be, combined into a cubic chamber surrounding the object to be examined and arranged on an object table 4, all transducers via fibre optical light conductors illuminating the photo-mosaic entrance window 7 of picture scanning and amplifying means 8.

Applying the invention to mass spectrometry, which is another field of investigation of properties of materials to which the invention may be applied with advantage, the only modification of the arrangement illustrated in FIG. 1 is that instead of X-ray source 2, table 4 and detector screen 5 as described above, conventional equipment of mass spectrometry is utilized in combination with a detector for converting ionic pulses into light pulses, as well known in the art, the detector means in this particular case being arranged linearly to receive ions generated and deflected during measurements along the line, the discrete elements of the line shaped detector means being connected to the entrance window 7 of scanning and amplifying means 8, there arranged in form of a surface to be scanned, the coordinates of a picture point of the entrance window 7 being representative of the coordinate of the corresponding element of the line shaped detector means 5.

While this invention has been described with respect to specific examples thereof, it should not be considered as being limited thereto. Various modifications and substitutions will be obvious to everyone skilled in the art and can be made without departing from the scope of this invention.

What I claim is:

1. A method for measuring the magnitudes of a number of quantities which may vary very rapidly within wide limits, especially for use in crystallographic X-ray analysis and mass spectrometry, said method comprising the steps of converting each quantity into a light signal having an intensity corresponding to the magnitude of the respective quantity, integrating each light signal individually with respect to time, effecting the individual integration of all of said signals during successive, accurately defined time intervals, and determining after each such interval which of the integrals have reached a predetermined level.

2. A method according to claim 1, comprising the step of determining upon each time interval which of the integrals have reached any of a plurality of predetermined levels.

3. A method according to claim 1 wherein the integration is terminated at the end of each time interval and restarted from zero at the beginning of the next following interval, each subsequent time interval having a length exceeding that of the next preceeding interval.

4. A method according to claim 1 wherein the intergration is caused to continue successively from one time interval to another.

5. A method for measuring the magnitudes of a number of quantities which may vary very rapidly within wide limites, especially for use in crystallographic X-ray analysis and mass spectrometry, said method comprising the steps of integrating with respect to time variables proportional to the individual quantities and which may consist of said quantities themselves, effecting the integration of said individual quantities during successive, accurately defined time intervals, and determining after each such interval which of the integrals have reached at least one predetermined level.

6. An apparatus for measuring the magnitudes of a number of quantities which may vary very rapidly within wide limits, especially intended to be used in crystallographic X-ray analysis and mass spectrometry, said apparatus comprising converting means arranged to convert each quantity into a light signal having an intensity corresponding to the magnitude of the respective quantity, means for integrating each light signal, control means operative with the integrating means, to effect individual integration of each light signal during successive, accurately defined time intervals, and means for determining after each such interval which of the integrals have reached a predetermined level.

7. Apparatus according to claim 6, comprising means for determining after each time interval which of the integrals have reached any of a plurality of predetermined levels.

8. Apparatus according to claim 6 comprising integrating means having a smaller linear integration range than the maximum range of variation of the quantities to be measured.

9. An apparatus according to claim 6 comprising light propagation fibre means connecting the integrating means to individual converting means.

10. An apparatus according to claim 6 wherein the integrating means consists of a single target of a television camera tube.

11. An apparatus according to claim 6 wherein the converting means includes a plurality of light tranducers combined into a cubic chamber to receive a specimen in which said quantities originate.

12. An apparatus for measuring the magnitudes of a number of quantities which may vary very rapidly within wide limites, especially intended to be used in crystallographic X-ray analysis and mass spectrometry, said apparatus comprising means for integrating variables proportional to the individual quantities, control means operative with the integrating means to effect the integration during successive, accurately defined time intervals, and means for determining after each such interval which of the integrals have reached at least one predetermined level.

* * * * *